Oct. 3, 1950 A. H. PEARSON 2,524,538
INDEXING DEVICE

Filed April 9, 1945 2 Sheets-Sheet 1

INVENTOR.
ALAN H. PEARSON
BY
ATTORNEYS

Oct. 3, 1950
A. H. PEARSON
2,524,538
INDEXING DEVICE
Filed April 9, 1945
2 Sheets-Sheet 2
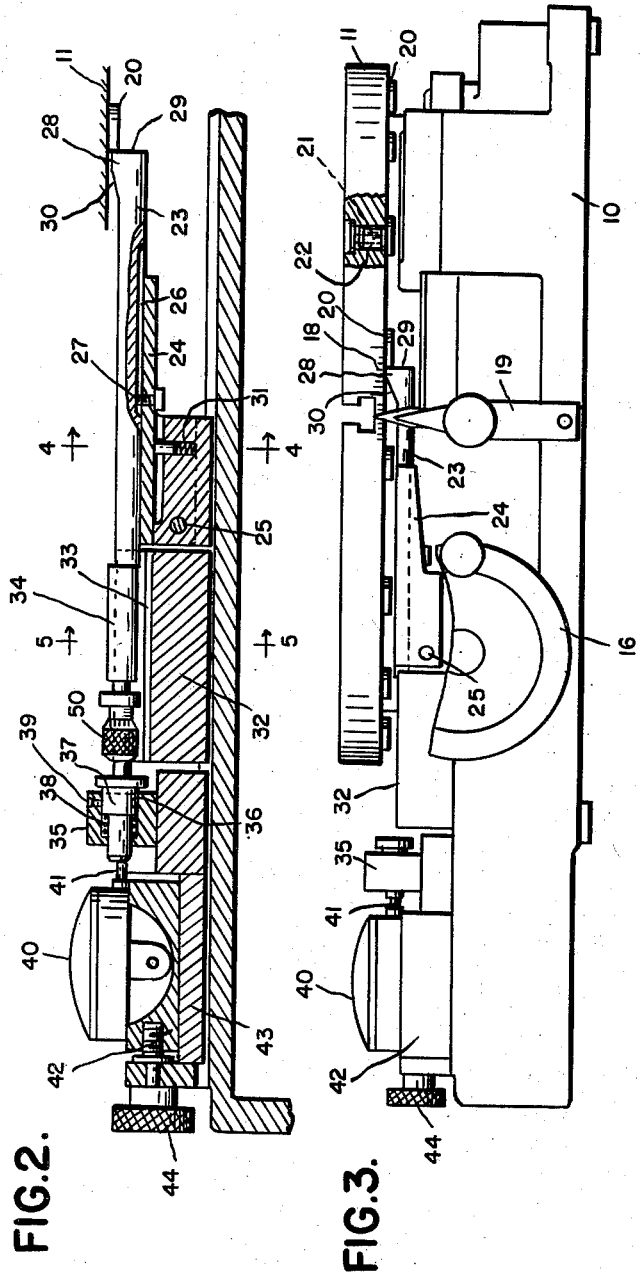
INVENTOR.
ALAN H. PEARSON Patented Oct. 3, 1950

2,524,538

UNITED STATES PATENT OFFICE 2,524,538

INDEXING DEVICE

Alan H. Pearson, Detroit, Mich., assignor to Pearson, Inc., Detroit, Mich., a corporation of Michigan Application April 9, 1945, Serial No. 587,226

2 Claims. (Cl. 33—174)

This invention relates generally to machine tools and refers more particularly to improvements in indexing tables of the general type used to accurately locate work pieces for checking or machining purposes.

Rotary indexing tables heretofore employed usually comprise table graduations in degrees, table dial graduations in minutes and table dial vernier graduations in seconds. The table is ordinarily supported for rotation throughout 360° of travel and a suitable hand wheel is connected to the table through worm gearing for rotating the table.

There are at least three definite limitations in the above general type of indexing table which make it extremely difficult to index the table within the limits of the extremely close tolerances usually specified in precision work. First, initial precision operation of the table depends upon the degree of accuracy existing in the gear train connecting the hand wheel to the table and continued accuracy depends upon the extent of wear of the parts of this gear train. Second, all settings are visually indicated by the graduations previously mentioned and since the graduations designating minutes and seconds of degrees are extremely fine, accurate setting of the table is rendered very difficult. Third, when the table is used for checking or indicating the location of holes in a work piece, it is necessary to compute rather intricate mathematical problems and this requirement not only consumes considerable time and requires the services of an operator skilled in mathematics but, in addition, increases the possibility of error. It follows that the accuracy of determining hole locations, for example, depends on the inherent accuracy of the table mechanism, which is subject to wear, and also on the skill of the operator in not only computing the particular mathematical problems involved, but in accurately setting the table from the extremely fine graduations previously referred to.

One of the principal objects of this invention is to improve the accuracy of indexing tables and, at the same time, simplify as well as reduce the time required to set the table to different predetermined angular positions. In accordance with this invention, the accuracy of the gearing connecting the hand wheel to the table and the wear of this gearing over long periods of use has no effect on the operation of the table to accurately position the work. Moreover, the construction of the indexing table is such as to enable locating the table to predetermined angular positions without the necessity of making mathematical computations and without the necessity of using fine vernier graduations. This feature not only reduces the time required to set the table to a minimum but, in addition, eliminates the most common causes of error in setting the table.

The foregoing as well as other objects will be made more apparent as this description proceeds, especially when considered in connection with the accompanying drawings, wherein:

Figure 2 is a sectional view taken substantially on the plane indicated by the line 2—2 of Figure 1;

Figure 3 is a side elevation of the device shown in Figure 1; and

Figure 1:
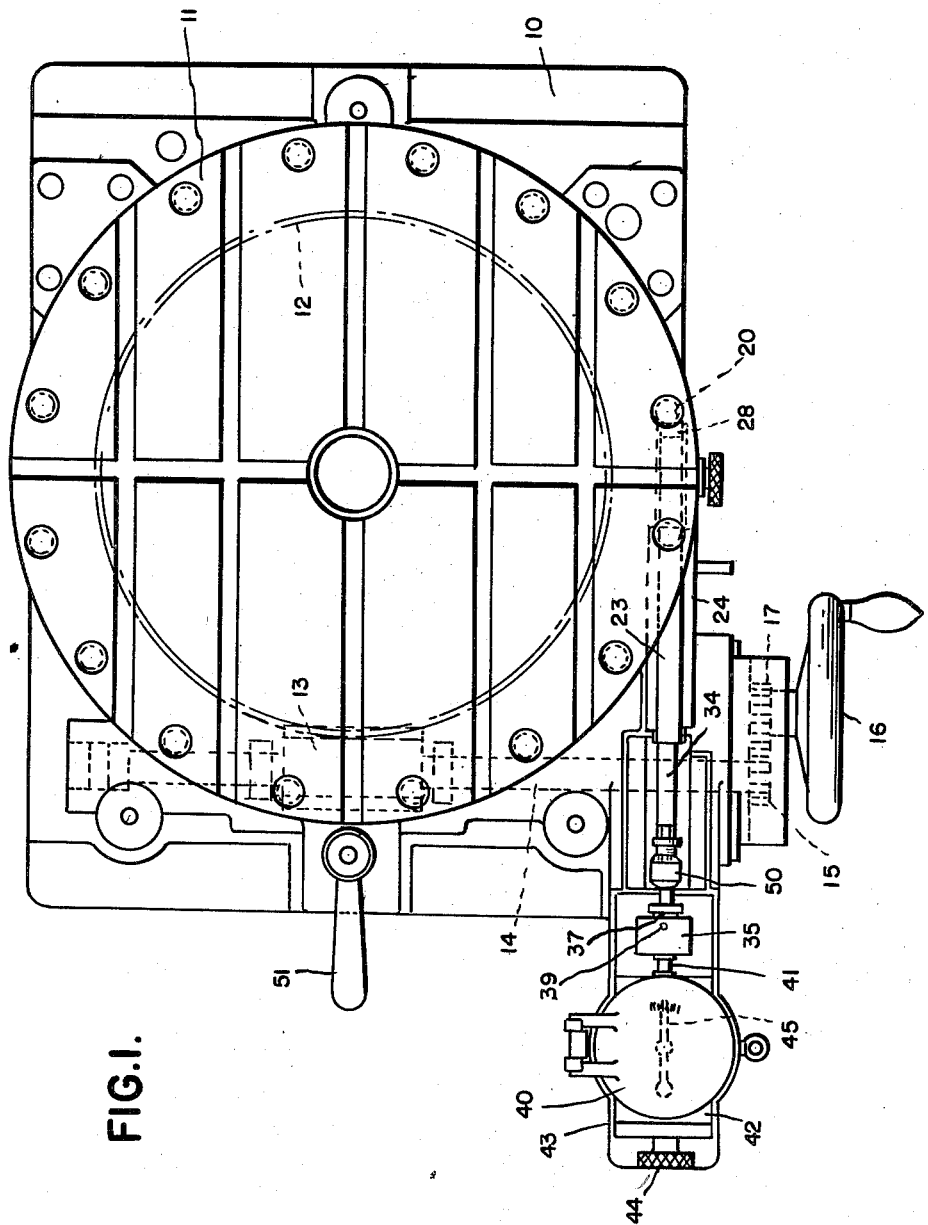
Figure 1 is a plan view of an indicating device embodying the features of this invention.

Figures 4 and 5 are respectively cross-sectional views taken on the lines 4—4 and 5—5 of Figure 2.

The indexing device illustrated in the several figures of the drawings comprises a base 10 and a table 11 supported at the top of the base for rotation about a vertical axis. The particular method employed for rotatably supporting the table 11 forms no part of this invention and, therefore, is not described in detail. It will suffice to point out that the table is rotated by worm gearing comprising a worm wheel 12 secured to the underside of the table in concentric relation to the axis of rotation of the latter and a worm 13 positioned for meshing engagement with the worm wheel. The worm 13 is secured to a shaft 14 journalled in the base and having a pinion 15 secured to one end thereof. The shaft is rotated by a hand wheel 16 positioned for convenient manipulation by the operator and connected to the shaft 14 by a pinion 17 arranged to mesh with the pinion 15. The ratio between the pinions is such that one complete revolution of the hand wheel 16 advances the table throughout one degree of travel.

The outer rim of the table 11 is graduated to indicate degrees and one-half degrees of travel. These graduations are indicated generally by the reference character 18 and an adjustable pointer 19 is fixed to the base 10 for cooperation with the graduations to indicate angular movement of the table 11.

The table 11 is also provided with circumferentially spaced projections or buttons 20 on the bottom surface thereof adjacent the periphery of the same. These projections are very accurately located on the table and are spaced equal distances from each other. In the present instance, the table is provided with sixteen projections spaced 22½° from each other. For the purpose of illustrating this invention, the projections or buttons 20 are in the form of headed plugs having shank portions 21 fitted in ground bushings 22 which, in turn, are located in accurately bored holes in the table.

The buttons 20 or the heads of the plugs 21 are selectively engageable with a slide 23 supported on the base 10 for sliding movement along a path which extends perpendicular to a vertical plane including the axis of rotation of the table 11. The slide 23 is mounted on the base 10 through the medium of a guide 24 having the outer end pivotally connected to the base by a pin 25, which is arranged to enable swinging movement of the guide and slide in a plane perpendicular to the plane of rotation of the table 11. As shown in Figure 2 of the drawings, the bottom surface of the slide 23 is formed with an elongated slot 26 intermediate the ends thereof for engaging a pin 27 extending upwardly from the guide 24.

Referring now more in detail to Figure 3 of the drawings, it will be noted that the inner end of the slide is formed with an upwardly extending projection 28 having an end wall 29 forming an abutment for engagement by the buttons 20 upon rotation of the table in a clockwise direction and having a tapered portion 30 positioned for engagement by the buttons 20 upon rotation of the head 11 in a counter-clockwise direction. This tapered portion 30 cooperates with the buttons 20 upon counter-clockwise rotation of the table 11 to swing the slide 23 and guide 24 downwardly sufficiently to enable the buttons 20 to pass over the projecting end 28 of the slide. Suitable spring means 31 is provided for resisting swinging movement of the guide 24 about the pin 25 and thereby normally maintains the slide 23 in its normal operative position.

Supported on the base 10 at the outer side of the guide 24 is a V-block 32 having a groove 33 in the top face aligned with the slide 23 for receiving a bar 34. In actual practice, the groove 33 is adapted to interchangeably receive bars of varying lengths and these bars are very accurately machined so that their lengths correspond exactly to predetermined dimensions.

Supported at the outer end of the block 32 and fixed to the base 10 is a member 35 having a bore 36 in axial alignment with the slide 23 and the groove 33 in the V-block 32. A plunger 37 is slidably supported in the bore 36 and projects through a reduced opening in the outer side of the member 35. The plunger 37 is normally urged in an inward direction by a coil spring 38 and is held against displacement from the bore by a pin 39. The pin 39 is anchored in the member 35 and projects into a longitudinally extending groove formed in the plunger 37.

Positioned on the base at the outer side of the member 35 is a dial type indicator 40 having its operating shaft 41 in alignment with the plunger 37 for engagement thereby. The indicator 40 is secured in a slide 42 adjustably mounted on a bracket 43 by means of a thumb screw 44 journalled in the bracket and threadedly engaging the slide 42. The indicator has a dial graduated in tenths of thousandths of an inch and is provided with a rotatable pointer 45.

In use, the indicator 40 is adjusted to a position wherein the pointer 45 indicates the "zero" graduation when the plunger 37 is in its innermost or extended position with respect to the member 35. Assuming now that it is desired to rotate the table 11 throughout an angular distance of 25° 12′ 8″, the operator manipulates the hand wheel 16 to rotate the table throughout an angular distance somewhat greater than the above indicated angle. For this purpose, the operator uses the graduations 18 on the rim of the table 11 in conjunction with the pointer 19 secured to the base of the table. This adjustment is merely approximate and no difficulty is encountered in performing the same. The decimal equivalent of the sine for the angle 25° 12′ 8″ is then determined preferably by reference to a handbook or table, and a gage bar 34 of a length somewhat less than the decimal equivalent of the sine for the above angle is positioned in the groove 33 in abutting engagement with the outer end of the slide 23. In this connection, it will be noted that gage blocks or micrometer bars may be employed for the above purpose, if desired. In the event a gage bar or gage blocks are used, it is preferred to position a micrometer 50 between the bar or blocks and the plunger 37. This micrometer is adjusted so that the combined lengths of the latter and of the blocks or bar 34 correspond exactly to the decimal equivalent of the sine for the angle desired. After the above setting is accomplished, the table 11 is adjusted to engage the adjacent projection or button 20 with the inner end of the slide 23, and movement of the table is continued until the dial indicator 40 reads "zero." When this condition exists, the table is accurately positioned at the desired angle and is secured from further movement by a suitable clamp 51. It follows from the above that the present invention renders it possible to locate the table 11 by the sine bar method, which is not only relatively simple, but is extremely accurate.

What I claim as my invention is:

1. An indexing device comprising a table supported for rotation in opposite directions and having circumferentially spaced projections adjacent the periphery thereof, a slide extending generally tangentially to the path of travel of the projections and having the inner end positioned to selectively engage the projections upon rotation of the table in one direction, a pivotal support for the slide enabling the inner end to be swung out of the path of travel of the projections, means at the inner end of the slide engageable with an adjacent projection upon rotation of the table in the opposite direction to swing the inner end of the slide out of the path of travel of the projections, an abutment spaced from the outer end of the slide, and adjustable gauging means between the abutment and outer end of the slide cooperating with the projections on the table to locate the latter in any one of a number of predetermined angular positions of adjustment.

2. An indexing device comprising a table supported for rotation in opposite directions and having circumferentially spaced projections adjacent the periphery thereof, a slide extending generally tangentially to the path of travel of the projections and having the inner end positioned to selectively engage the projections upon rotation of the table in one direction, a guide for the slide supported for swinging movement in a plane normal to the plane of rotation of the table to move the inner end of the slide out of the path of travel of the projections, means at the inner end of the slide engageable with the adjacent projection upon rotation of the table in the opposite direction to swing the guide in a direction to move the inner end of the slide out of the path of travel of the projections, an abutment spaced from the outer end of the slide, and adjustable gauging means between the abutment and outer end of the slide cooperating with the projections on the table to locate the latter in any one of a number of predetermined angular positions of adjustment.

ALAN H. PEARSON.

REFERENCES CITED

The following references are of record in the file of this patent:

UNITED STATES PATENTS

| Number | Name | Date |
| --- | --- | --- |
| 1,007,185 | Craley | Oct. 31, 1911 |
| 1,323,367 | Hanson | Dec. 2, 1919 |
| 1,508,974 | Jackson | Sept. 16, 1924 |
| 2,158,649 | Armitage | May 16, 1939 |
| 2,173,519 | Jones | Sept. 19, 1939 |
| 2,236,881 | Rusnak | Apr. 1, 1941 |
| 2,309,142 | Stafford | Jan. 26, 1943 |
| 2,406,906 | Saunders | Sept. 3, 1946 |

FOREIGN PATENTS

| Number | Country | Date |
| --- | --- | --- |
| 408,394 | Great Britain | Apr. 12, 1934 |